(12) United States Patent
Barber et al.

(10) Patent No.: US 7,027,923 B2
(45) Date of Patent: Apr. 11, 2006

(54) METHOD FOR DETERMINING SONDE ERROR FOR AN INDUCTION OR PROPAGATION TOOL WITH TRANSVERSE OR TRIAXIAL ARRAYS

(75) Inventors: Thomas D. Barber, Houston, TX (US); Hanming Wang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 222 days.

(21) Appl. No.: 10/707,427

(22) Filed: Dec. 12, 2003

(65) Prior Publication Data

US 2005/0143920 A1 Jun. 30, 2005

(51) Int. Cl.
*G01V 3/18* (2006.01)

(52) U.S. Cl. ............................. 702/7; 702/10; 324/343

(58) Field of Classification Search .................... 702/7, 702/10, 11; 324/338, 339, 343, 303
See application file for complete search history.

(56) References Cited

U.S. PATENT DOCUMENTS

| | | | |
|---|---|---|---|
| 3,510,757 A | 5/1970 | Houston | |
| 3,609,521 A | 9/1971 | Desbrandes | |
| 4,360,777 A | 11/1982 | Segesman | |
| 4,800,496 A | 1/1989 | Barber et al. | |
| 5,757,997 A * | 5/1998 | Birrell et al. | 385/60 |
| 5,781,436 A | 7/1998 | Forgang et al. | |
| 6,297,639 B1 | 10/2001 | Clark et al. | |
| 6,304,086 B1 | 10/2001 | Minerbo et al. | |
| 6,380,744 B1 | 4/2002 | Clark et al. | |
| 6,541,979 B1 | 4/2003 | Omeragic | |
| 6,553,314 B1 | 4/2003 | Kriegshauser | |
| 6,556,015 B1 | 4/2003 | Omeragic et al. | |
| 6,556,016 B1 * | 4/2003 | Gao et al. | 324/343 |
| 6,557,794 B1 | 5/2003 | Rosthal et al. | |
| 6,566,881 B1 | 5/2003 | Omeragic et al. | |
| 6,573,222 B1 | 6/2003 | Nair et al. | |
| 6,584,408 B1 | 6/2003 | Omeragic | |
| 6,594,584 B1 | 7/2003 | Omeragic et al. | |
| 6,624,634 B1 * | 9/2003 | Rosthal et al. | 324/338 |

(Continued)

OTHER PUBLICATIONS

Anderson et al., "The Response of Induction Tools to Dipping, Anisotropic Formations," SPWLA 36th Annual Logging Symposium, Jun. 26-29, 1995.

(Continued)

*Primary Examiner*—Donald McElheny, Jr.
(74) *Attorney, Agent, or Firm*—Kevin P. McEnaney; Victor H. Segura; Brigitte L. Echols

(57) ABSTRACT

A method for determining a sonde error in a logging tool comprising a transverse array includes obtaining a first measurement using the transverse array while the logging tool is at a first height from ground in a selected orientation; obtaining a second measurement using the transverse array while the logging tool is at a second height from the ground in the selected orientation; deriving a difference measurement from the first measurement and the second measurement; determining a background signal using the difference measurement and a predetermined function, wherein the predetermined function relates earth signals in a plurality of signals obtained at the second height to a plurality of difference signals between signals obtained at the first height and the second height at a plurality of formation conductivities; and determining the sonde error by subtracting the background signal from the second measurement.

26 Claims, 10 Drawing Sheets

U.S. PATENT DOCUMENTS

| | | |
|---|---|---|
| 6,630,830 B1 | 10/2003 | Omeragic et al. |
| 6,667,620 B1 | 12/2003 | Homan et al. |
| 2002/0057210 A1 | 5/2002 | Frey et al. |
| 2002/0079899 A1 | 6/2002 | Frey et al. |
| 2003/0085707 A1 | 5/2003 | Minerbo et al. |
| 2003/0184304 A1 | 10/2003 | Homan et al. |
| 2003/0184488 A1 | 10/2003 | Smith et al. |
| 2003/0200029 A1 | 10/2003 | Omeragic et al. |
| 2003/0229450 A1 | 12/2003 | Strickland |
| 2004/0113609 A1 | 6/2004 | Homan et al. |

OTHER PUBLICATIONS

Moran et al., "Effects of Formation Anisotropy on Resistivity-Logging Measurements," Geophysics vol. 44, No. 7 (Jul. 1979) pp. 1266-1286.

* cited by examiner

METHOD FOR DETERMINING SONDE ERROR FOR AN INDUCTION OR PROPAGATION TOOL WITH TRANSVERSE OR TRIAXIAL ARRAYS

BACKGROUND OF INVENTION

1. Field of the Invention

This invention relates generally to the field of electric well logging. More particularly, the invention relates to methods for determining sonde errors in electromagnetic induction and propagation tools.

2. Background Art

Electromagnetic (EM) induction and propagation tools have been used for many years to measure the resistivity of earth formations surrounding a borehole. EM logging tools measure the resistivity (or its inverse, conductivity) of the formation by inducing eddy currents in the form ations in response to an AC transmitter signal. The eddy currents induce secondary magnetic fields that in turn induce voltages in receiver antennas. Because the magnitudes of the eddy currents depend on formation conductivities, the magnitudes of the received signals reflect the formation conductivities.

Ideally, an induction or propagation logging tool should read zero in a zero-conductivity medium. However, EM logging tools include conductive materials (such as sonde wiring, quadraxes, bulkheads, electrodes for spherical focused logs mounted on the induction sonde, etc.) that can respond to the magnetic field generated by the transmitter. The induced eddy currents in these metal parts produce a constant signal in the receivers. Consequently, an induction or propagation tool will not read zero in a zero-conductivity medium. This self-signal is referred to as a sonde error. In principle, the sonde error can be determined by suspending the tool in free space far from any external conductive material. However, most induction or propagation tools are designed to measure far into the formation (i.e., deep depth of investigation) to determine formation resistivity beyond the zone of invasion. These "deep-reading" tools render free-space determinations of sonde errors impractical. For this reason, a method for sonde error correction has been disclosed in U.S. Pat. No. 4,800,496, which is issued to Barber et al. ("the Barber patent") and assigned to the assignee of the present invention. This patent is incorporated by reference in its entirety.

The methods disclosed in the Barber patent provide sonde error corrections for conventional induction tools by making measurements at two different distances from the earth. An algorithm then relates the difference in the voltages at the two heights to the earth signal. Finally, the earth signal is subtracted from the sonde reading to obtain the true sonde error. The true sonde error can then be used to correct the logging measurements.

Conventional induction logging tools have their transmitters and receivers arranged in a manner such that their magnetic moments are aligned with the longitudinal axis of the tools. These longitudinal induction array tools induce eddy currents in loops that are perpendicular to the longitudinal axes of the tools. Conventional induction tool cannot provide accurate resistivity estimates of formations with anisotropy. Formation anisotropy results from the manner in which formation beds were deposited by nature. Formations containing hydrocarbons often exhibit anisotropy in formation resistivity. In such formations, the horizontal conductivity, $\sigma_h$ (or resistivity, $R_h$) in a direction parallel to the bedding plane differs from the vertical conductivity, $\sigma_v$, (or resistivity, $R_v$) in a direction perpendicular to the bedding plane.

To measure conductivity of a formation with anisotropy, new EM induction or propagation tools typically include transverse arrays that have transmitter and/or receiver antennas arranged such that their magnetic moments are substantially perpendicular to the axis of the instrument. See e.g., Moran and Gianzero, "*Effects of Formation Anisotropy on Resistivity Logging Measurements*," Geophysics, 44, 1266–1286 (1979). Transverse array tools include triaxial array tools. Each triaxial array in these tool includes three orthogonal transmitter coils and three receivers coils in the same orthogonal orientations. In operation, the triaxial transmitter is energized in three orthogonal directions. Individual receiver coils, aligned in the same three orthogonal directions, then measure the voltages induced by eddy currents flowing in the surrounding formations. Examples of tri-axial tools may be found in U.S. Pat. No. 3,510,757 issued to Huston, U.S. Pat. No. 5,781,436 issued to Forgang et al., U.S. Pat. No. 3,609,521, issued to Desbrandes, U.S. Pat. No. 4,360,777, issued to Segesman, and U.S. Pat. No. 6,553,314 issued to Kriegshäuser, et al.

In contrast to a conventional induction tool, which induces eddy currents flowing in planes perpendicular to the longitudinal axis of the tool, a transverse array induces eddy currents that flow in planes parallel to the longitudinal axis of the tool. A triaxial array has a transmitter and a receiver, each having three coils arranged in orthogonal directions. Therefore, there are nine couplings between the transmitter and the receiver in a triaxial array. Each coupling is sensitive to different directions of eddy current flows. Furthermore, each EM induction or propagation tool typically includes multiple arrays. Accordingly, sonde error calibration for EM tools having transverse or a triaxial arrays is more complicated than that for a conventional induction tool, and it is desirable to have methods that can calibrate sonde errors for an EM tool having transverse or triaxial arrays.

SUMMARY OF INVENTION

In one aspect, embodiments of the invention relate to methods for determining a sonde error in a logging tool comprising a transverse array. A method in accordance with one embodiment of the invention for determining a sonde error in a logging tool comprising a transverse array includes obtaining a first measurement using the transverse array while the logging tool is at a first height from ground in a selected orientation; obtaining a second measurement using the transverse array while the logging tool is at a second height from the ground in the selected orientation; deriving a difference measurement from the first measurement and the second measurement; determining a background signal using the difference measurement and a predetermined function, wherein the predetermined function relates earth signals in a plurality of signals obtained at the second height to a plurality of difference signals between signals obtained at the first height and the second height at a plurality of formation conductivities; and determining the sonde error by subtracting the background signal from the second measurement.

In one aspect, embodiments of the invention relate to methods for determining a sonde error in a logging tool comprising a triaxial array. A method in accordance with one embodiment of the invention for determining a sonde error in a logging tool comprising a triaxial array includes obtaining a first measurement for at least one coupling of the triaxial array while the logging tool is at a first height from ground in a selected orientation; obtaining a second measurement for the at least one coupling of the triaxial array while the logging tool is at a second height from the ground in the selected orientation; deriving a difference measurement from the first measurement and the second measurement for the at least one coupling of the triaxial array; determining a background signal using the difference measurement and a predetermined function for the at least one coupling of the triaxial array, wherein the predetermined function relates earth signals in a plurality of signals obtained at the second height to a plurality of difference signals between signals obtained at the first height and the second height at a plurality of formation conductivities; and determining the sonde error by subtracting the background signal from the second measurement for the at least one coupling of the triaxial array.

In one aspect, embodiments of the invention relate to systems for determining a sonde error in a logging tool comprising a transverse array. A system in accordance with one embodiment of the invention for determining a sonde error in a logging tool having a transverse array, the system including a memory storing a program including instructions for: obtaining a first measurement using the transverse array while the logging tool is at a first height from ground in a selected orientation; obtaining a second measurement using the transverse array while the logging tool is at a second height from the ground in the selected orientation; deriving a difference measurement from the first measurement and the second measurement; determining a background signal using the difference measurement and a predetermined function, wherein the predetermined function relates earth signals in a plurality of signals obtained at the second height to a plurality of difference signals between signals obtained at the first height and the second height at a plurality of formation conductivities; and determining the sonde error by subtracting the background signal from the second measurement.

In one aspect, embodiments of the invention relate to systems for determining a sonde error in a logging tool comprising a triaxial array. A system in accordance with one embodiment of the invention for determining a sonde error in a logging tool having a triaxial array, the system including a memory storing a program including instructions for: obtaining a first measurement for at least one coupling of the triaxial array while the logging tool is at a first height from ground in a selected orientation; obtaining a second measurement for the at least one coupling of the triaxial array while the logging tool is at a second height from the ground in the selected orientation; deriving a difference measurement from the first measurement and the second measurement for the at least one coupling of the triaxial array; determining a background signal using the difference measurement and a predetermined function for the at least one coupling of the triaxial array, wherein the predetermined function relates earth signals in a plurality of signals obtained at the second height to a plurality of difference signals between signals obtained at the first height and the second height at a plurality of formation conductivities; and determining the sonde error by subtracting the background signal from the second measurement for the at least one coupling of the triaxial array.

Other aspects and advantages of the invention will be apparent from the following description and the appended claims.

DETAILED DESCRIPTION

Embodiments of the present invention relate to methods for determining the earth signal in an induction or propagation tool with transverse or triaxial arrays so that the sonde error (or self-signal) in the tool can be accurately determined as if the tool were disposed in free space. The method involves measuring the signals from all couplings in the transverse or triaxial arrays at two distances from the earth's surface and using an algorithm to relate the measurements at the two distances to the earth signal.

Figure 1:
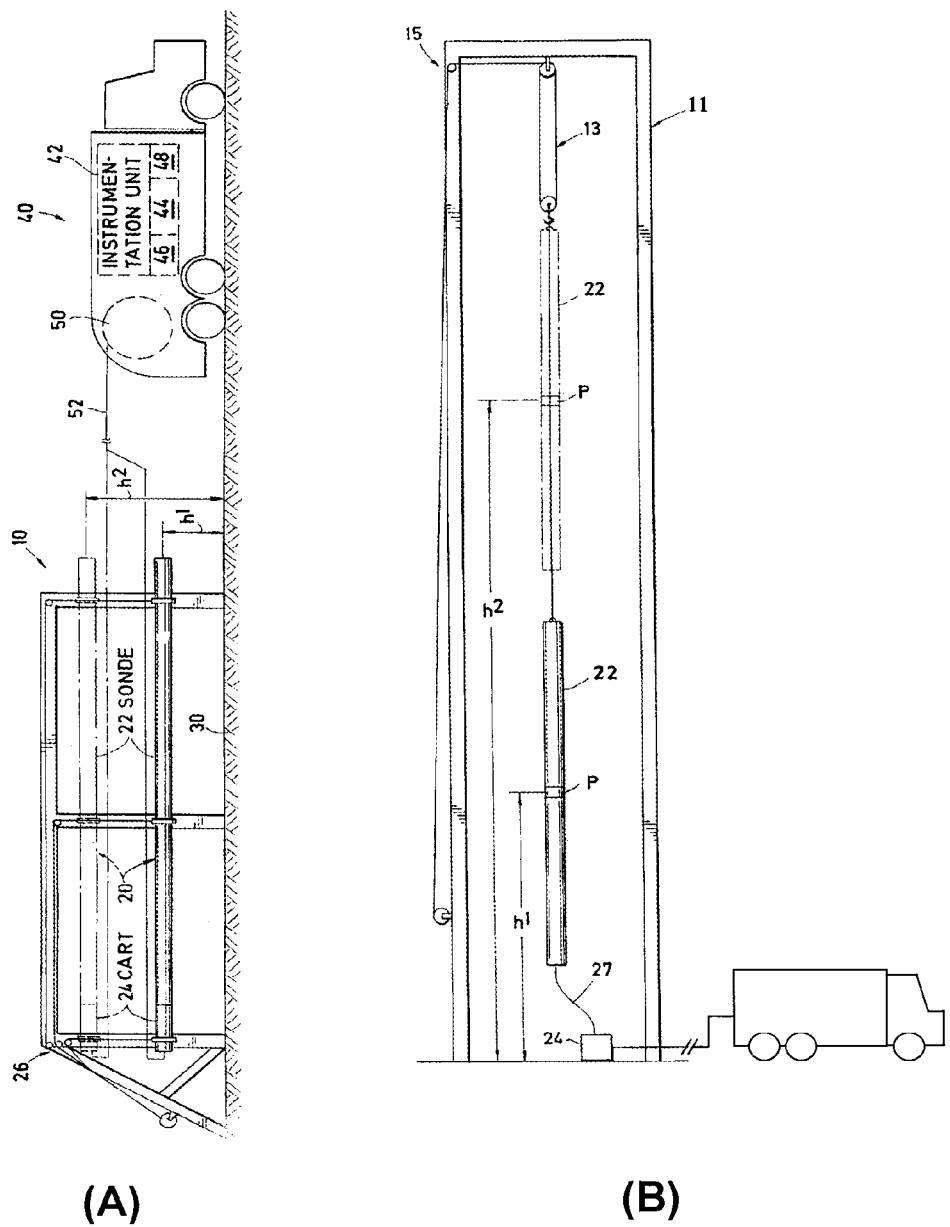
FIGS. 1A and 1B, respectively, show prior art horizontal and vertical sonde error calibration facilities.

FIG. 1A illustrates a horizontal or "parallel" sonde error facility 10 and FIG. 1B illustrates a "vertical" sonde error facility, as disclosed in the Barber patent. The same or similar setups may be used with embodiments of the present invention. One of ordinary skill in the art would appreciate that although a "vertical"or "horizontal" setup is preferred, other setups may also be used with embodiments of the invention. As shown in FIG. 1A, the sonde error facility 10 enables an induction or propagation logging tool 20 to be placed substantially horizontal to the earth 30. The sonde error facility 10 preferably has a minimum amount of metal or conductive material. For example, it may be constructed of wooden posts and wooden dowels. The rope pulley system 26 is used to bring the tool 20, logging sonde 22 and cartridge 24 to a first height $h^1$ and subsequently to height $h^2$, and vice versa. The cartridge 24 includes, for simplicity of illustration, both an electronic cartridge and telemetry cartridge of a usual induction or propagation logging tool. A mobile instrumentation and control unit 40 is provided in proximity to the sonde error facility 10. An instrumentation unit 42 comprising a processing unit 44, power supply 46 and recorder 48 is provided as standard equipment in the well logging art. A logging cable 52 connects the induction or propagation logging tool 20 via a logging winch 50 to the instrumentation unit 40.

Figure 2:
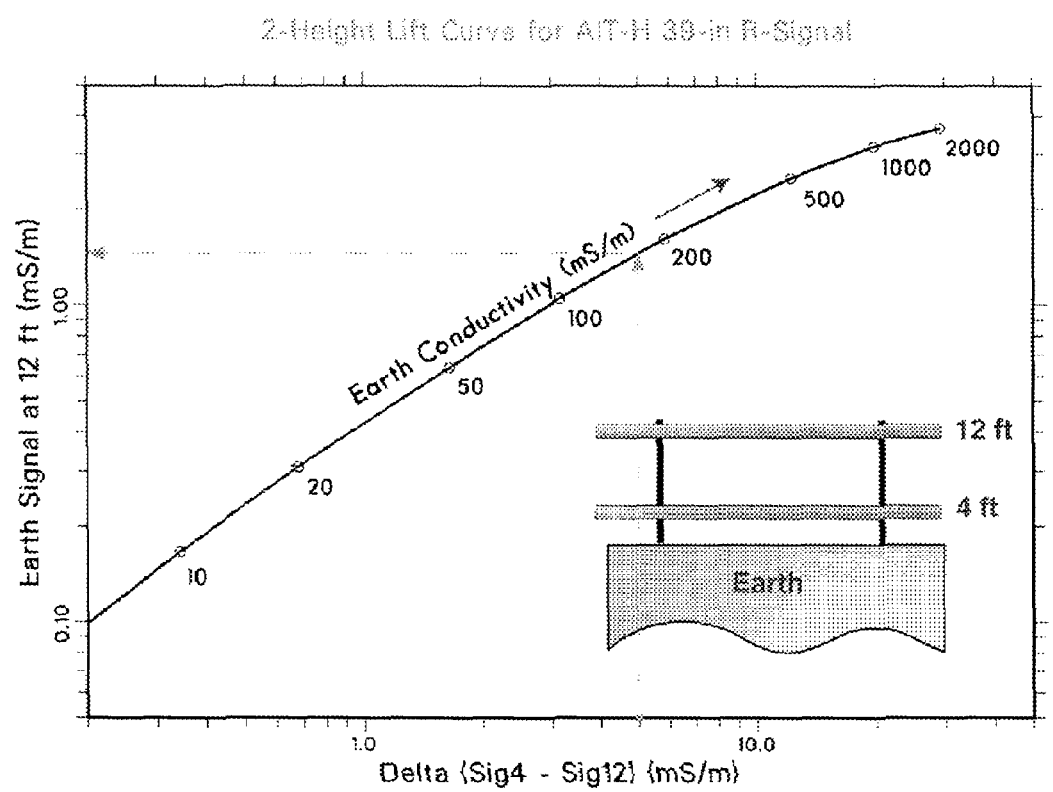
FIG. 2 shows a cross plot of earth signals as a function of difference measurements at two heights for a conventional induction tool.

According to the methods disclosed in the Barber patent, sonde responses are measured at two heights. The difference in the sonde readings at the two heights is a function of the earth signal. FIG. 2 shows a correlation chart relating the voltage difference at the two heights to the earth signal for a conventional induction or propagation tool. The curve line is a cross-plot of the earth signal at the upper level (12 feet) as a function of the difference in measurements ($\delta\sigma$) at the upper (12 ft) and the lower (4 ft) levels. By using this chart and the difference between the measurements at the two heights, the earth signal ($\sigma_e$) at the upper position can be determined. The earth signal ($\sigma_e$) can then be subtracted from the sonde reading at the upper position (e.g., 12 feet) to derive the intrinsic sonde reading (sonde error). The sonde error can then be used correct the logging measurements.

Although the method outlined above has been used for some time for conventional induction logging tools, a tool with transverse arrays (e.g., triaxial arrays) will set up different eddy-current patterns. For example, a transverse transmitter would induce eddy currents to flow in planes parallel to the longitudinal axis of the tool. In contrast, a conventional longitudinal magnetic dipole antenna induces eddy currents in loops perpendicular to the longitudinal axis of the tool. A triaxial array comprises a transmitter and a receiver, each of which has three coils typically arranged in orthogonal directions. That is, a triaxial array has, in addition to the standard z-axis coils, additional collocated coils that are oriented in orthogonal directions (i.e., transverse coils).

Figure 3:
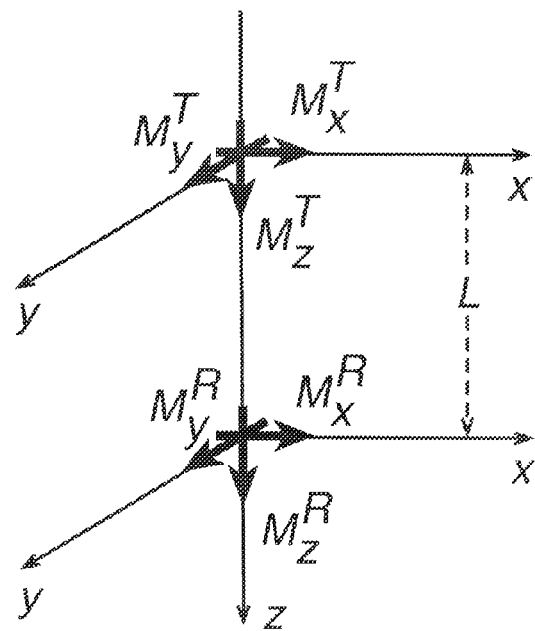
FIG. 3 shows a schematic of a triaxial array, illustrating the magnetic moments of each coils.

FIG. 3 shows a schematic of a typical triaxial array. The three coils in the transmitter have their magnetic moments aligned in x, y, and z directions, i.e., $M^T_x$, $M^T_y$, and $M^T_z$. The receiver has three coils aligned in the same orthogonal directions, and hence their magnetic moments are $M^R_x$, $M^R_y$, and $M^R_z$. In operation, each of the transmitter coils may be energized and the signals detected by each of the receiver coils. Therefore, there are 9 possible measurements for each triaxial array. An EM induction or propagation tool typically includes multiple triaxial arrays. Thus, sonde error correction for an EM induction or propagation tool having multiple triaxial arrays is significantly more complicated than a convention induction tool.

In a triaxial array, the 9 components (couplings) measured may be represented as:

$$\begin{bmatrix} xx & yx & zx \\ xy & yy & zy \\ xz & yz & zz \end{bmatrix} \quad (1)$$

Each element in this matrix represents a coupling (ab) from transmitter a to receiver b, e.g., yx refers to the coupling from the y transmitter to the x receiver.

Figure 4:
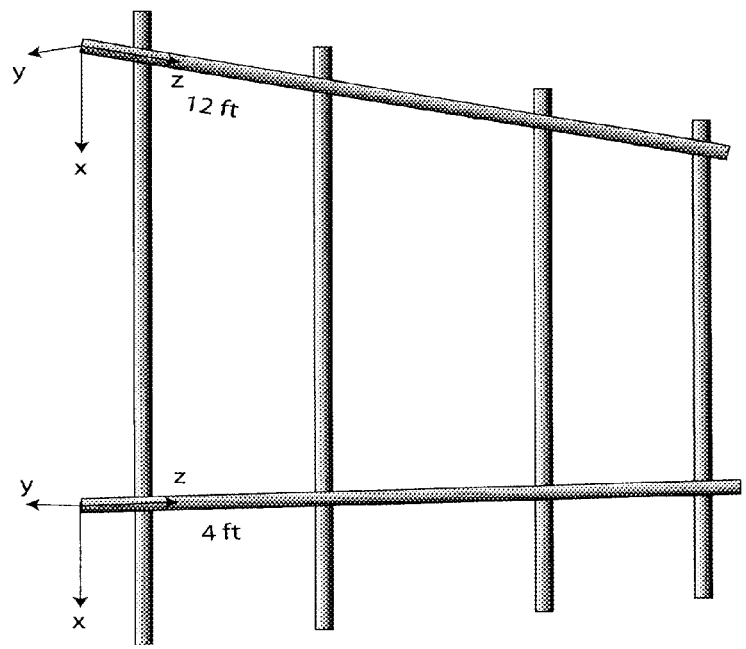
FIG. 4 shows a sonde error calibration facility according to one embodiment of the invention.

To calibrate the sonde error of a triaxial array, the directions of the transmitter and receiver coils should be defined. Analogous to the sonde error calibration facility shown in FIG. 1A, a setup for calibrating a triaxial array is depicted in FIG. 4. As shown, a triaxial tool is arranged on the lift station with the x-direction pointing downward and the y-direction parallel to the air-ground interface. With this single position, all the sonde errors can be calculated without the confusion of rotating the tool on the lift station. With the setup shown in FIG. 4, the xy, yx, yz, and zy coupling signals should be zero, and the tool readings for these couplings at 12 feet can be used as the approximate sonde errors to be subtracted from the respective logging measurements.

One of skill in the art would appreciate that the setup shown in FIG. 4 is for illustration only and other variations may be used without departing from the scope of the invention. For example, the heights of the two positions may be different from the 4 ft and 12 ft shown. Furthermore, the y-axis may be pointed towards the ground and the x-axis may be parallel to the air-surface interface. With this alternative setup, the xy, yx, xz, and zx coupling signals should be zero, and the tool readings at 12 feet are the approximate sonde errors to be subtracted from the corresponding logging measurements. It is also possible to perform two measurements at each height, one with the x-axis downward and one with the y-axis downward. In this case, approximate sonde errors may be obtained from the sonde readings of the xy, yx, yz, zy, xz, and zx couplings. Thus, only three couplings (xx, yy, and zz) need to be calibrated. Furthermore, although not preferred, it is also possible to have the x-axis and y-axis tilted away from the downward and parallel to the earth surface positions. In this case, the xy, yx, yz, zy, xz, and zx coupling signals would not be zero, and the sonde errors for these couplings should be calculated just like other couplings.

While the setup shown in FIG. 4 has the tool lying in a direction parallel to the earth surface (i.e., horizontal mode), calibration may also be performed with the tool hanging in a vertical mode at two heights as shown in FIG. 1B. In the vertical mode, the z-axis is perpendicular to the air-ground interface, while both the x-axis and y-axis are parallel to the air-ground interface in the vertical mode. Thus, in a vertical setup, the couplings for xy and yx should read zero.

Figure 5:
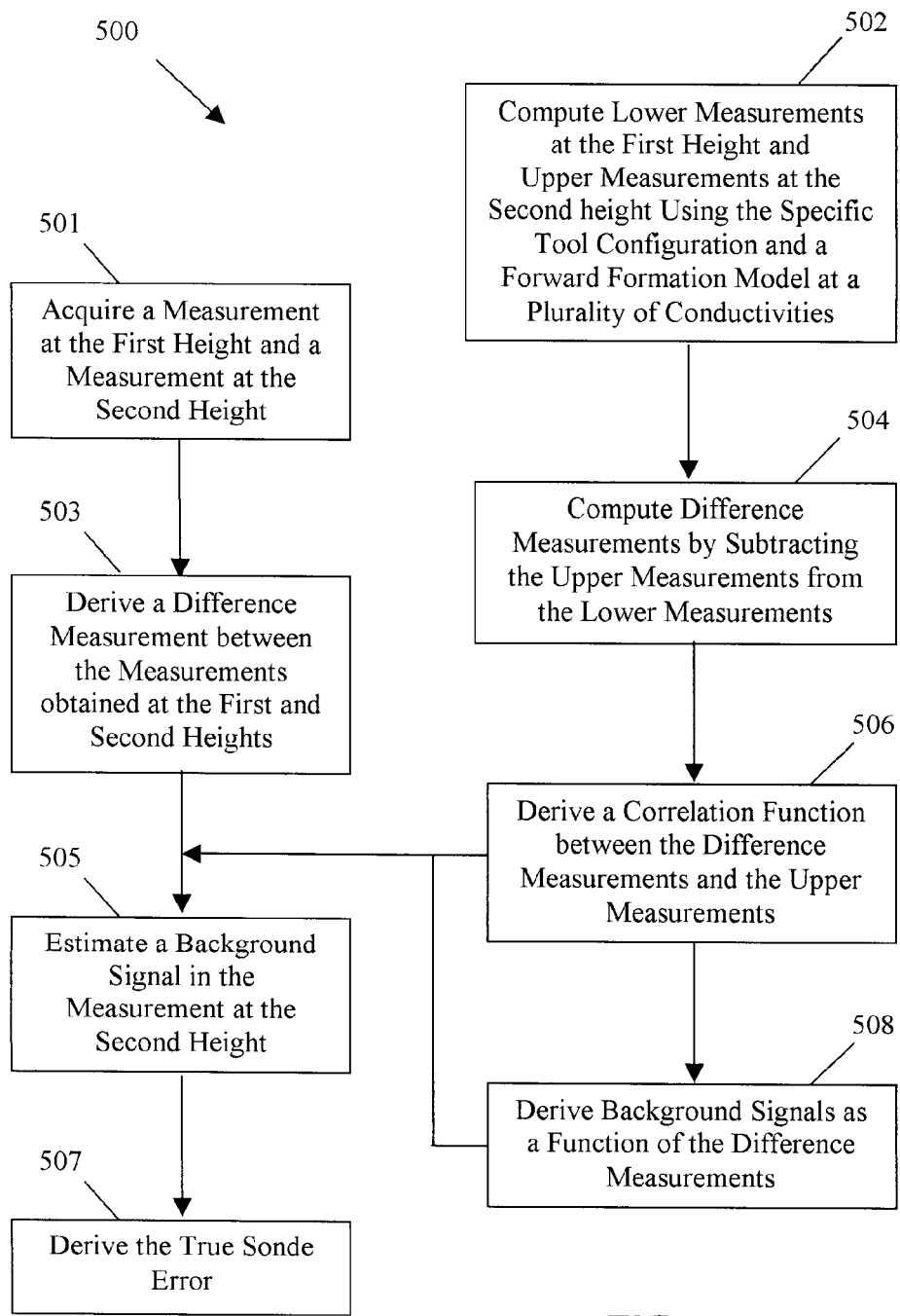
FIG. 5 shows a method for sonde error correction according to one embodiment of the invention.

FIG. 5 shows a flow chart of a method 500 for calculating a sonde error for any coupling of a triaxial array. The method 500 illustrates the steps involved in determining the true sonde error in each coupling, i.e., xx, xy, yz, etc. First, signals (measurements) are simulated for the particular tool at the upper and lower positions, using a forward model of layered formations. The model takes into account the tool configuration (e.g., array spacing), operating frequency, and the setup configuration, among other factors. A suitable code for such simulation, for example, is disclosed in Anderson, et al., "*The Response of Induction Tools to Dipping Anisotropic Formations,*" *Transactions of the SPWLA* 36th *Annual Logging Symposium*, Paris, France, Jun. 26–29, 1995, paper D. The code described in this paper can model any coil-type logging tool, including induction tool and propagation tool, response in one-dimensional horizontally-layered TI medium. The tensor Green functions are presented in form of spectral integrals and decomposed into a radial-azimuthal wave and an axial plane wave. This factorization reduces the three-dimensional integration to a one-dimensional integration where the radial-azimuthal solution is common to the entire system. At the interface, the transmission and reflection of the axial plane wave are used to described the EM wave in layered-medium. The impedance boundary conditions at the layer boundaries are used to determine the reflection coefficients and transmission coefficients in a recursive format. The one-dimensional integration contour over the radial wave number is carefully selected to ensure the accuracy. The measurements are simulated for a range of formation conductivities to provide a series of measurements (step 502).

The signals may be separately simulated for the real (R) components and the quadrature (X) components. In the case of the X components, the unbalanced mutual from the transmitter is also a major contributor to the sonde error. The R and X signals may then be separately used in the following process.

Unlike conventional induction tools, the measurements of which are typically presented as conductivities, the raw data of triaxial tools will be in units of impedance (that is, the impedance between the transmitter and receiver through the earth coupling). The impedance units preserve the tensor characteristics necessary for simple rotation matrices to be used in coordinate transformations (from a tool coordinate system to an earth coordinate system, and vice versa). Accordingly, the sonde errors are preferably calculated and fitted as impedances. In order to produce reasonable units for floating-point calculation, the impedance units are preferably micro-ohms.

Next, difference measurements ($\delta$) are computed by subtracting the upper signals (U) from the corresponding lower signals (L) for each formation conductivity (step 504), i.e., $\delta = L - U$.

Note that the upper (U) and lower (L) signals (measurements) each include a contribution (signal) from true sonde error (TSE) and a contribution (signal) from earth conductivity ($\sigma_e$). For example, the upper (U) and lower (L) measurements may be represented as:

$$U = TSE + Z_U \quad (2)$$

and $$L = TSE + Z_L \quad (3)$$

where $Z_U$ and $Z_L$ represent the signals contributed by the earth conductivity in the upper and lower measurements, respectively. Accordingly, the difference ($\delta$) may be represented as:

$$\delta = Z_L - Z_U = f'(\sigma_e) \quad (4)$$

Equation (4) shows that the difference signal ($\delta$) is a function of the earth conductivity ($\sigma_e$) because the earth background signals, $Z_U$ and $Z_L$ both are functions of the earth conductivity ($\sigma_e$).

As shown in Equation (2), the upper measurement (U) includes a signal ($Z_u$) from earth conductivity. Therefore, the upper measurement (U) is a also function of the earth conductivity ($\sigma_e$). Because the difference measurements ($\delta$) and the upper measurements (U) both depend on earth conductivity ($\sigma_e$), a relationship exists between them. Thus, the next step is derive this correlation function (step 506). One method for deriving this correlation function is illustrated as follows.

The relationship exists between the difference measurements ($\delta$) and the upper measurements (U) is better defined in the natural logs of these measurements because signals received by the receivers depend on the exponential functions of the conductivities. For example, this relationship may be defined as $\ln[abs(U)] = f\{\ln[abs(\delta)]\}$, where $abs(\delta)$ and $abs(U)$ represent the absolute values of the difference signals ($\delta$) and the upper measurements (U), respectively. The absolute values are used because most couplings produce negative impedance values. It is unnecessary to determine the precise form of the function f. Instead, the function f may be approximated as a polynomial function P, which may be defined as:

$$P = -\sum_{n=1}^{N} a_n [\ln(-\delta)]^n \quad (5)$$

for all couplings except the xz coupling, which is positive. For the xz coupling, $$P = \sum_{n=1}^{N} a_n [\ln(\delta)]^n. \quad (6)$$

The polynomial coefficients, $a_0, a_1, \ldots a_n$, depend on the characteristics of the tool configuration (e.g., array spacings), the impedance component being evaluated (R or X signals), and the frequency of the measurement. These coefficients may be defined by a least square fit of $\ln[abs(\delta)]$ to $\ln[abs(U)]$. While the above uses the upper (U) measurements as an example, one of ordinary skill in the art would appreciate that the process may also use the lower (L) measurements.

Once the correlation function is defined, i.e., the coefficients for the relationship are found from the least square fit, the earth background signal contribution in the upper signal measurement at each earth conductivity ($\sigma_e$) can be calculated (step 508). The background signals in the upper measurements, $Z_U$, may be defined as $e^P$, i.e., $Z_U = e^P$, where P is the polynomial function shown in Equation (5) or (6), and the coefficients are defined by the least square fit as described in step 506. The background signals as a function of the formation conductivity or as a function of the difference measurements at the two heights may be stored for later use, either as a lookup table or presented as a cross plot shown in FIG. 6 to be described later.

Once the correlation function between the difference measurements and the upper signals (or the background signals in the upper signals) is defined, it can be used to determine the true sonde error in the particular tool. First, two measurements, one each at the first and second heights, are acquired using the tool in the same correction facility (step 501). Then, a difference measurement is obtained from the two measurements (step 503). This difference measurement is then used together with the correlation function obtained in step 506 or the background signal table or curve obtained in step 508 to provide the background signal in the upper measurement (step 505). The estimated background signal in the upper measurement is then subtracted from the upper measurement to provide the true sonde error (TSE) (step 507).

Figure 6:
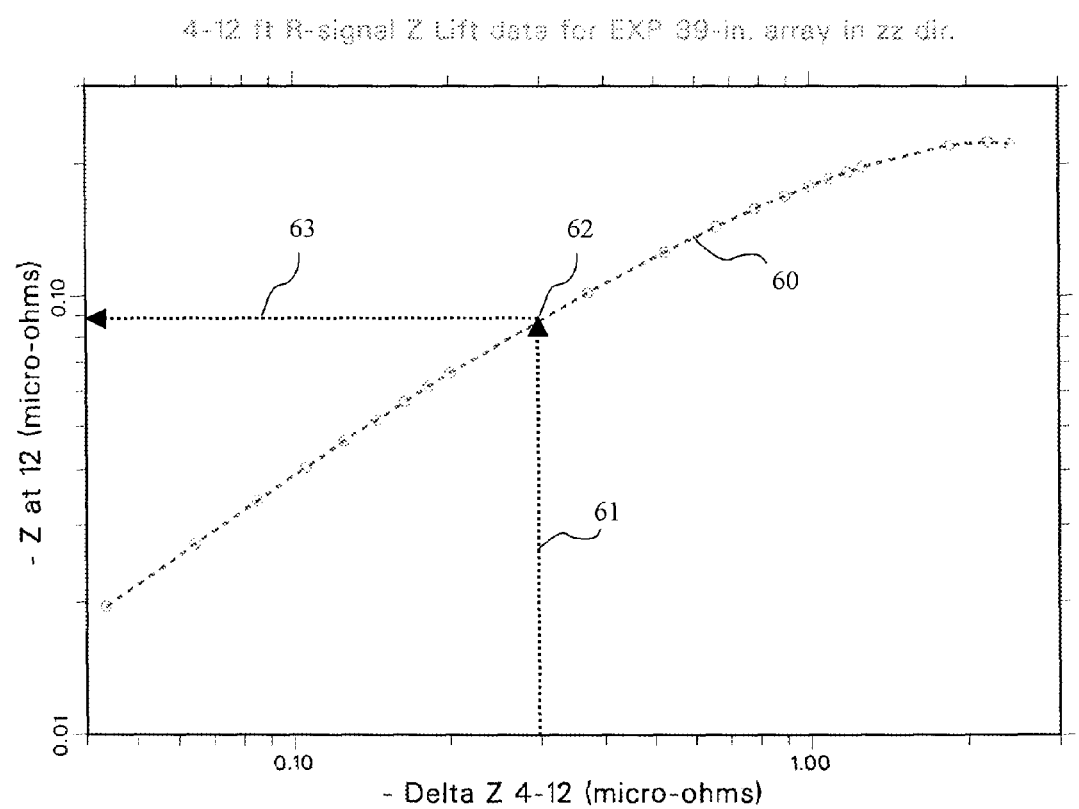
FIG. 6 shows a cross plot of earth signals in the zz coupling of a triaxial array as a function of different measurements at two heights according to one embodiment of the invention.
Figure 7:
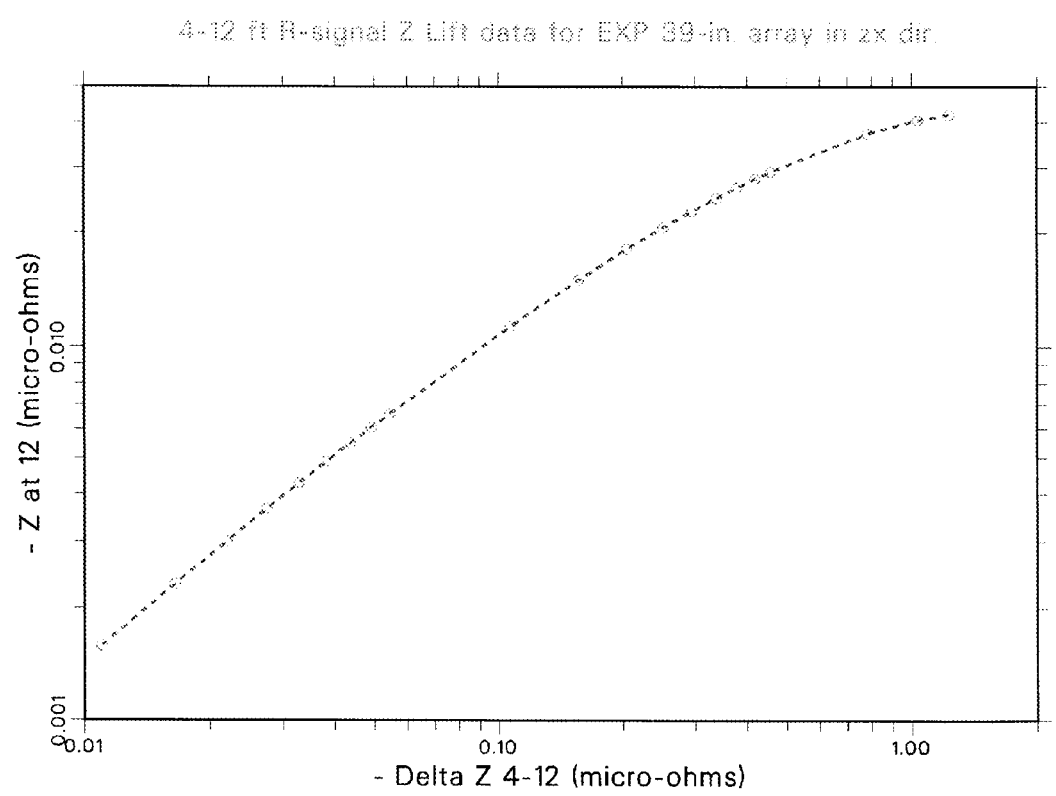
FIG. 7 shows a cross plot of earth signals in the zx coupling of a triaxial array as a function of different measurements at two heights according to one embodiment of the invention.
Figure 8:
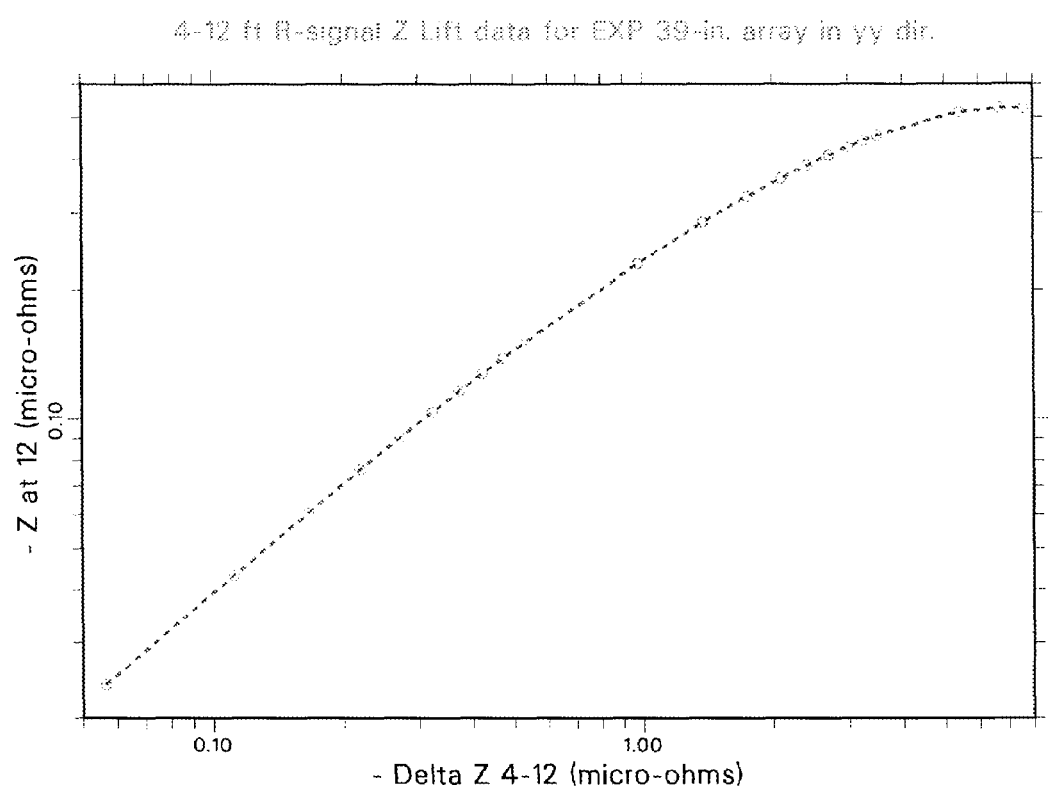
FIG. 8 shows a cross plot of earth signals in the yy coupling of a triaxial array as a function of different measurements at two heights according to one embodiment of the invention.
Figure 9:
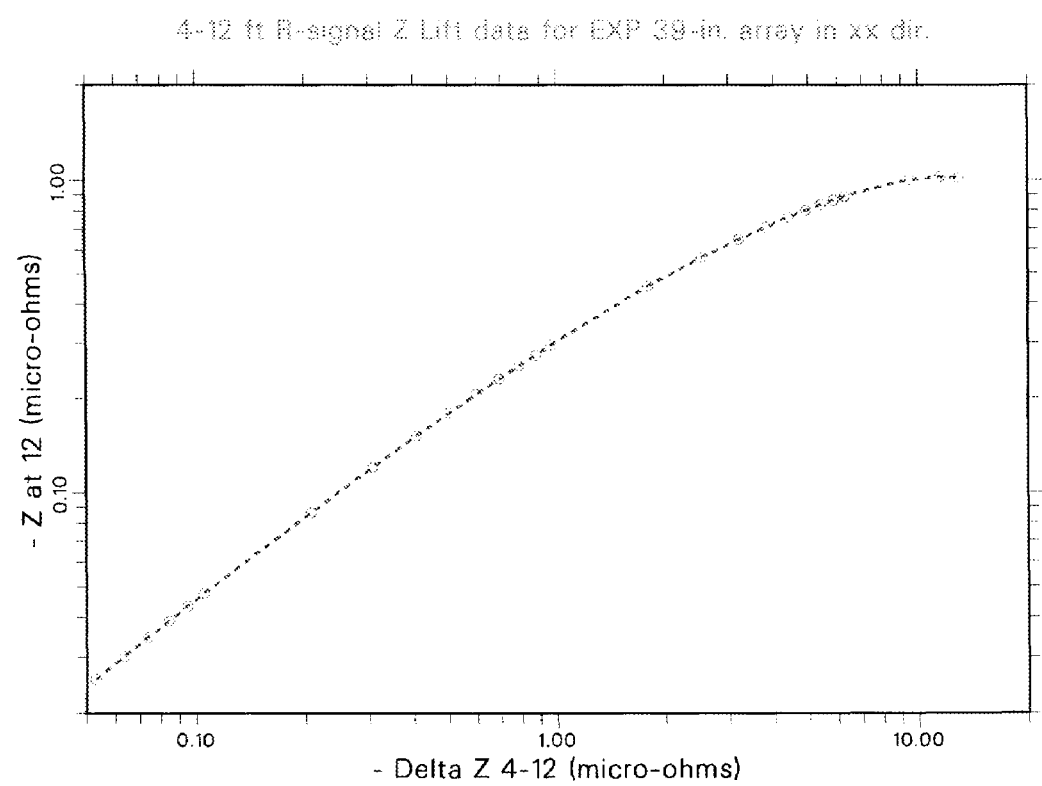
FIG. 9 shows a cross plot of earth signals in the xx coupling of a triaxial array as a function of different measurements at two heights according to one embodiment of the invention.
Figure 10:
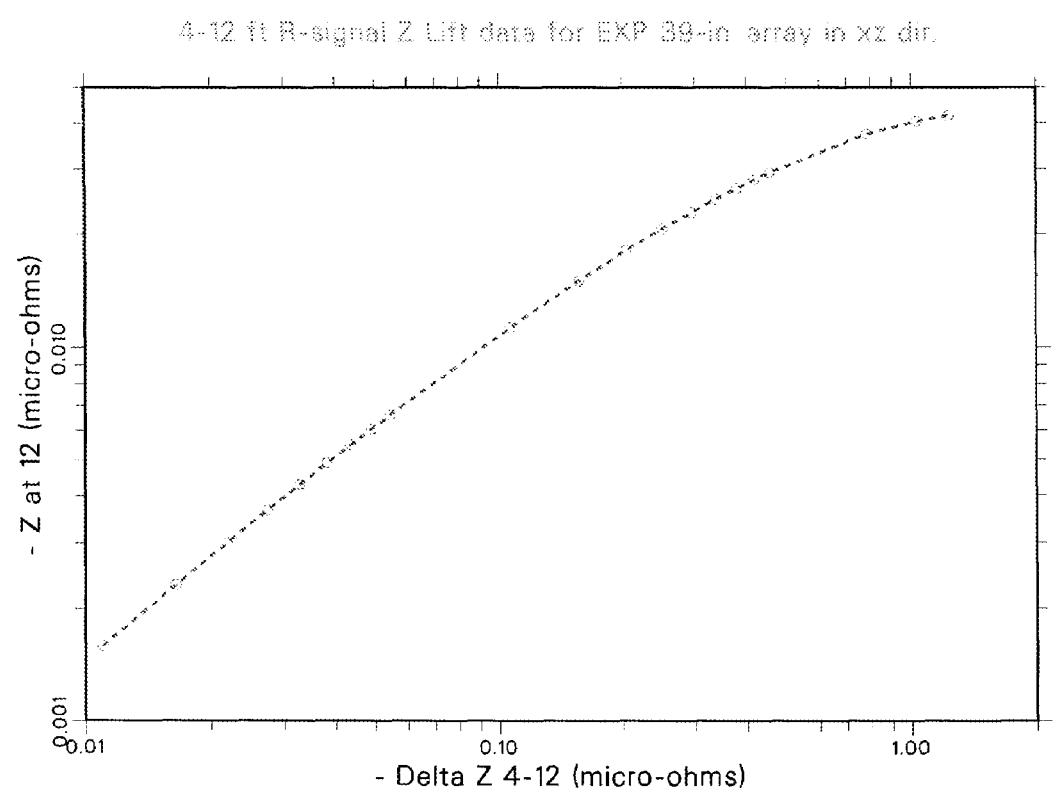
FIG. 10 shows a cross plot of earth signals in the xz coupling of a triaxial array as a function of different measurements at two heights according to one embodiment of the invention.

The foregoing processes of correlating the difference signals with the upper measurements and the fitting of the polynomial function may be better illustrated with a correlation plot. FIG. 6 shows a cross plot 60 of earth (background) signal as a function of the difference ($\delta$) between the 4-ft and 12-ft zz measurements using a 39-in array of an electromagnetic propagation tool. The tool is set up as shown in FIG. 4 and the R-signals are measured at 26.8074 KHz at various formation conductivities ranging from 1 mS/m to 2000 mS/m. In this plot, the x-axis represents the difference measurements ($\delta$), which is a function of the earth conductivity ($\sigma_e$), and the y-axis represents the calculated background signals ($Z_{12}$) in the upper measurements. The curve 60 is based on the coefficients derived from the polynomial fit of the difference measurements to the upper measurements.

Using this chart and the difference ($\delta$) between the zz measurements at the two heights, the signal contributed by the earth conductivity ($Z_{12}$) at the upper position can be determined. For example, a line 61 may be drawn at the difference value between the two-height measurements. The line 61 intercepts the cross plot curve 60 at point 62. A horizontal line 63 is then drawn from point 62 to obtain the value of the background signal contributed by the earth conductivity. The background signal can then be subtracted from the sonde reading at the upper position (12 feet) to derive the true sonde error.

While the above description uses the upper measurements for deriving the correlation function and for determining the true sonde error, one of ordinary skill in the art would appreciate that the same procedures may be applied using the lower measurements. Therefore, embodiments of the invention are not limited to the use of the upper measurements. The calibration procedures may be used with the tool in the vertical mode or the horizontal mode. Furthermore, embodiments of the invention may be used for an induction tool or a propagation tool.

Note that the true sonde error and the coefficients for the above described correlation function depend on array configurations (e.g., array spacings and coil orientations). Therefore, the true sonde error for each coupling (xx, yy, zz, xz, zx, etc.) should be separately calculated. FIGS. 7–10 show cross plots of other couplings similar to that of FIG. 6. Furthermore, because the sonde error depends on the operating frequency, these calibrations should be performed with each frequency to be used in the logging operation.

Figure 11:
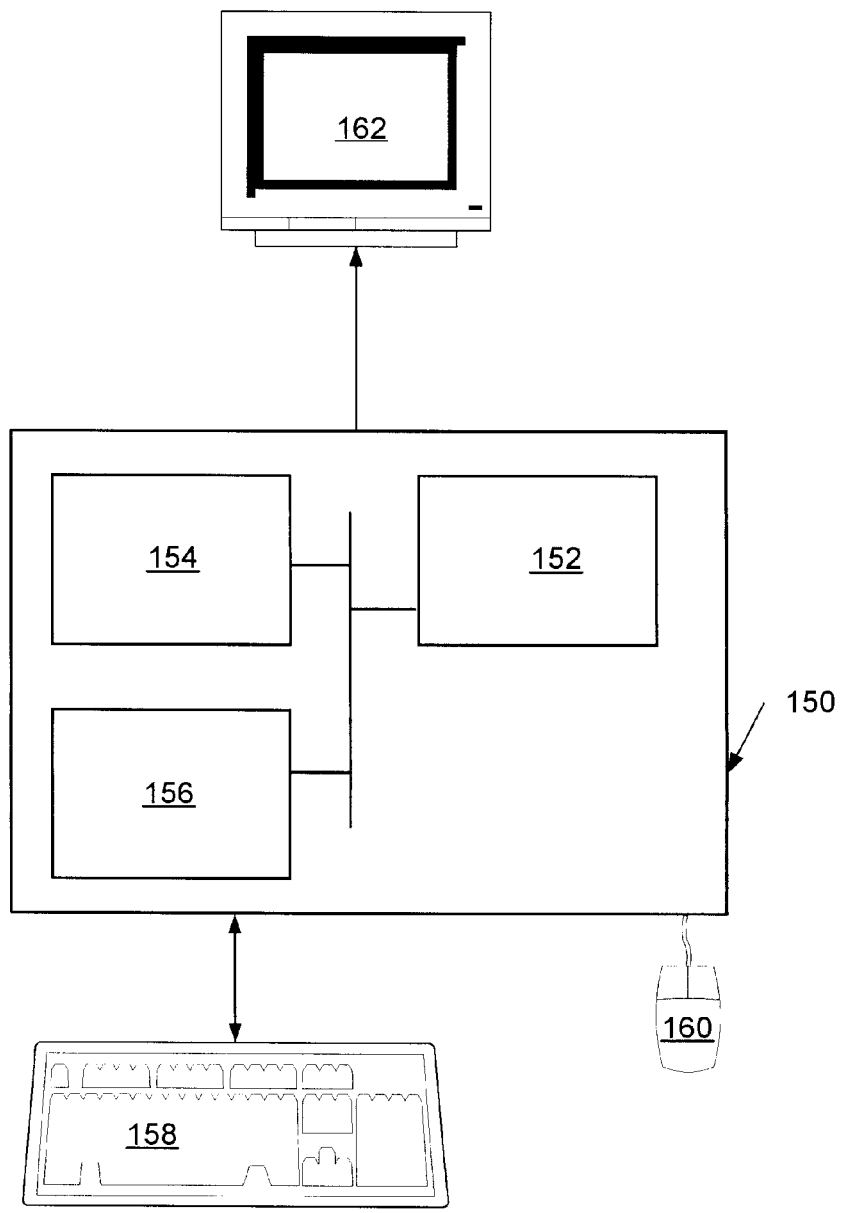
FIG. 11 is a block diagram of a typical general purpose computer system.

Some embodiments of the invention relate to systems for performing the methods described above. A system in accordance with embodiments of the invention may be a stand-alone unit for performing methods of the invention or may be incorporated into a drilling tool (e.g., the electronic cartridge 24 or the instrumentation unit 42 shown in FIG. 1A). A system in accordance with the invention typically includes a processor and a memory. In some embodiments, a system may be implemented on a general-purpose computer having a processor, a memory, and may optionally include other hardware. For example, as shown in FIG. 11, a typical computer (150) includes a processor (152), a random access memory (154), and a storage device (e.g., permanent memory or hard disk) (156). The computer (150) may also include input means, such as a keyboard (158) and a mouse (160), and output means, such as a monitor (162). Note that the general purpose computer is only for illustration and embodiments of the invention may take other forms (e.g., integrated in a logging tool).

In a system in accordance with the invention, the memory stores a program readable by the processor. The program, for example, may include instructions for performing the above described methods: obtaining measurements at two heights; deriving a difference measurement from the measurements at the two heights; deriving a background signal from the difference measurement using a predetermined function that correlates background signals in the upper measurements with the formation conductivities (or difference measurements at a plurality of formation conductivities); deriving the true sonde error by subtracting the background signal from the upper signal. The predetermined function (correlation function) is derived from a forward formation modeling and an algorithm fitting of the upper measurements to the difference measurements as described above.

The programming may be accomplished through the use of one or more program storage devices readable by the computer processor and encoding one or more programs of instructions executable by the computer for performing the operations described herein. The program storage device may take the form of, for example, one or more floppy disks; a CD-ROM or other optical disk; a magnetic tape; a read-only memory chip (ROM); and other forms of the kind well known in the art. The program of instructions may be in "object code," i.e., in binary form that is executable directly by the computer; in "source code" that requires compilation or interpretation before execution; or in some intermediate form such as partially compiled code. The precise forms of the program storage device and of the encoding of instructions are immaterial here.

Advantages of the invention may include the following. The methods for sonde error corrections are generally applicable to an induction tool or a propagation tool. Furthermore, these methods may be used with single-coil arrays or full triaxial arrays. The methods may also be used even if the arrays are not orthogonal arrays, i.e., tilted arrays. Embodiments of the invention do not require rotation of the tool to correct for coils in different orientations, only measurements at two or more heights are required. Because no rotation of the tool is needed, no error from imprecise rotation is introduced. Once the calibration is done, either the sonde error or the correction function and/or the coefficients may be stored for later correction of sonde error in logging measurements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a sonde error in a logging tool comprising a transverse array, comprising:
    obtaining a first measurement using the transverse array while the logging tool is at a first height from ground in a selected orientation;
    obtaining a second measurement using the transverse array while the logging tool is at a second height from the ground in the selected orientation;
    deriving a difference measurement from the first measurement and the second measurement;
    determining a background signal using the difference measurement and a predetermined function, wherein the predetermined function relates earth signals in a plurality of signals obtained at the second height to a plurality of difference signals between signals obtained at the first height and the second height at a plurality of formation conductivities; and
    determining the sonde error by subtracting the background signal from the second measurement.

2. The method of claim 1, wherein the first height is lower than the second height.

3. The method of claim 1, wherein the predetermined function is obtained by fitting the plurality of difference signals to the plurality of signals obtained at the second height.

4. The method of claim 1, wherein the predetermined function comprises a polynomial function.

5. The method of claim 1, wherein the plurality of signals obtained at the second height and the plurality of difference signals are derived from simulation of a formation model.

6. The method of claim 1, wherein the logging tool is arranged horizontally above the ground.

7. The method of claim 1, wherein the logging tool is arranged vertically above the ground.

8. A method for determining a sonde error in a logging tool comprising a triaxial array, comprising:
 obtaining a first measurement for at least one coupling of the triaxial array while the logging tool is at a first height from ground in a selected orientation;
 obtaining a second measurement for the at least one coupling of the triaxial array while the logging tool is at a second height from the ground in the selected orientation;
 deriving a difference measurement from the first measurement and the second measurement for the at least one coupling of the triaxial array;
 determining a background signal using the difference measurement and a predetermined function for the at least one coupling of the triaxial array, wherein the predetermined function relates earth signals in a plurality of signals obtained at the second height to a plurality of difference signals between signals obtained at the first height and the second height at a plurality of formation conductivities; and
 determining the sonde error by subtracting the background signal from the second measurement for the at least one coupling of the triaxial array.

9. The method of claim 8, wherein the first height is lower than the second height.

10. The method of claim 8, wherein the predetermined function is obtained by fitting the plurality of difference signals to the plurality of signals obtained at the second height.

11. The method of claim 8, wherein the predetermined function comprises a polynomial function.

12. The method of claim 8, wherein the plurality of signals obtained at the second height and the plurality of difference signals are derived from simulation of a formation model.

13. The method of claim 8, wherein the logging tool is arranged horizontally above the ground.

14. The method of claim 8, wherein the logging tool is arranged vertically above the ground.

15. A system for determining a sonde error in a logging tool having a transverse array, the system comprising a memory storing a program comprising instructions for:
 obtaining a first measurement using the transverse array while the logging tool is at a first height from ground in a selected orientation;
 obtaining a second measurement using the transverse array while the logging tool is at a second height from the ground in the selected orientation;
 deriving a difference measurement from the first measurement and the second measurement;
 determining a background signal using the difference measurement and a predetermined function, wherein the predetermined function relates earth signals in a plurality of signals obtained at the second height to a plurality of difference signals between signals obtained at the first height and the second height at a plurality of formation conductivities; and
 determining the sonde error by subtracting the background signal from the second measurement.

16. The system of claim 15, wherein the first height is lower than the second height.

17. The system of claim 15, wherein the predetermined function is obtained by fitting the plurality of difference signals to the plurality of signals obtained at the second height.

18. The system of claim 15, wherein the predetermined function comprises a polynomial function.

19. The system of claim 15, wherein the plurality of signals obtained at the second height and the plurality of difference signals are derived from simulation of a formation model.

20. A system for determining a sonde error in a logging tool having a triaxial array, the system comprising a memory storing a program comprising instructions for:
 obtaining a first measurement for at least one coupling of the triaxial array while the logging tool is at a first height from ground in a selected orientation;
 obtaining a second measurement for the at least one coupling of the triaxial array while the logging tool is at a second height from the ground in the selected orientation;
 deriving a difference measurement from the first measurement and the second measurement for the at least one coupling of the triaxial array;
 determining a background signal using the difference measurement and a predetermined function for the at least one coupling of the triaxial array, wherein the predetermined function relates earth signals in a plurality of signals obtained at the second height to a plurality of difference signals between signals obtained at the first height and the second height at a plurality of formation conductivities; and
 determining the sonde error by subtracting the background signal from the second measurement for the at least one coupling of the triaxial array.

21. The system of claim 20, wherein the first height is lower than the second height.

22. The system of claim 20, wherein the predetermined function is obtained by fitting the plurality of difference signals to the plurality of signals obtained at the second height.

23. The system of claim 20, wherein the predetermined function comprises a polynomial function.

24. The system of claim 20, wherein the plurality of signals obtained at the second height and the plurality of difference signals are derived from simulation of a formation model.

25. The system of claim 20, wherein the logging tool is arranged horizontally above the ground.

26. The method of claim 20, wherein the logging tool is arranged vertically above the ground.

* * * * *